(12) United States Patent
Lu et al.

(10) Patent No.: US 12,231,018 B2
(45) Date of Patent: Feb. 18, 2025

(54) MOTOR AND ELECTRIC APPLIANCE

(71) Applicants: Guangdong Midea White Home Appliance Technology Innovation Center Co., Ltd., Foshan (CN); Guangdong Welling Motor Manufacturing Co., Ltd., Foshan (CN); Midea Group Co., Ltd., Foshan (CN)

(72) Inventors: Jifang Lu, Foshan (CN); Guilie Zhong, Foshan (CN); Junfeng Hou, Foshan (CN); Dan Chen, Foshan (CN); Jian Hu, Foshan (CN)

(73) Assignees: GUANGDONG MIDEA WHITE HOME APPLIANCE TECHNOLOGY INNOVATION CENTER CO., LTD., Foshan (CN); GUANGDONG WELLING MOTOR MANUFACTURING CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 169 days.

(21) Appl. No.: 17/889,307

(22) Filed: Aug. 16, 2022

(65) Prior Publication Data

US 2022/0393542 A1 Dec. 8, 2022

Related U.S. Application Data

(63) Continuation of application No. PCT/CN2021/074296, filed on Jan. 29, 2021.

(30) Foreign Application Priority Data

Feb. 17, 2020 (CN) .......................... 202010096960.8
Feb. 17, 2020 (CN) .......................... 202020178756.6

(51) Int. Cl.
H02K 11/40 (2016.01)
F16C 19/00 (2006.01)
(Continued)

(52) U.S. Cl.
CPC ........... *H02K 5/1732* (2013.01); *H02K 5/225* (2013.01); *H02K 7/083* (2013.01)

(58) Field of Classification Search
CPC ........ H02K 11/40; H02K 5/16; H02K 5/1732; H02K 5/225; H02K 7/083; F16C 2380/28; F16C 19/00
(Continued)

(56) References Cited

U.S. PATENT DOCUMENTS 8,957,553 B2 * 2/2015 Hasegawa .............. H02K 11/40
310/90
9,570,953 B2 * 2/2017 Sato ...................... H02K 5/1732
(Continued)

FOREIGN PATENT DOCUMENTS

CN 202488283 U 10/2012
CN 104143873 A 11/2014
(Continued)

OTHER PUBLICATIONS

English Google machine translation of JP53-085508 (Year: 1976).*
(Continued)

*Primary Examiner* — Burton S Mullins
(74) *Attorney, Agent, or Firm* — Morgan, Lewis & Bockius LLP

(57) ABSTRACT

An electric motor and an electrical appliance are provided. The electric motor includes a rotating shaft, a stator, a rotor disposed on the rotating shaft, spaced apart from the stator, and embedded in the stator, a first end cover, and a first bearing. The first bearing includes a first outer ring fixed on the first end cover and insulated from at least part of the first (Continued)

end cover, a first inner ring embedded in the first outer ring, and a first ball disposed between the first outer ring and the first inner ring. The rotating shaft is fixed on the first inner ring and rotationally supported on the first end cover. The part of the first end cover that is insulated from the first outer ring is short-circuited with a stator core of the stator and is grounded.

10 Claims, 4 Drawing Sheets

(51) Int. Cl.
    *H02K 5/16*           (2006.01)
    *H02K 5/173*         (2006.01)
    *H02K 5/22*           (2006.01)
    *H02K 7/08*           (2006.01)

(58) Field of Classification Search
    USPC .................. 310/89, 400, 401; 361/212, 220
    See application file for complete search history.

(56) References Cited

U.S. PATENT DOCUMENTS

| | | | |
|---|---|---|---|
| 9,853,406 | B2 * | 12/2017 | Jang ........................ H02K 11/40 |
| 2021/0006120 | A1 * | 1/2021 | Oechslen ................ F16C 35/07 |

FOREIGN PATENT DOCUMENTS

| | | |
|---|---|---|
| CN | 203933231 U | 11/2014 |
| CN | 107017724 A | 8/2017 |
| CN | 206559160 U | 10/2017 |
| CN | 107947492 A | 4/2018 |
| CN | 108964335 A | 12/2018 |
| CN | 109546790 A | 3/2019 |
| CN | 110601454 A | 12/2019 |
| CN | 110798122 A | 2/2020 |
| CN | 211791053 U | 10/2020 |
| JP | S 5385508 U | 7/1978 |
| JP | 2005033999 A | 2/2005 |
| JP | 2007159302 A | 6/2007 |
| JP | 2011160575 A | 8/2011 |
| JP | 2012239638 A | 12/2012 |
| JP | 2015021544 A | 2/2015 |
| JP | 2015156794 A | 8/2015 |
| JP | 6113866 B2 | 4/2017 |
| JP | 6504908 B2 | 4/2019 |
| JP | 2019213369 A | 12/2019 |
| JP | 2020005445 A | 1/2020 |
| KR | 20190111113 A | 10/2019 |

OTHER PUBLICATIONS

Watanabe JP 20111600575 English Machine Translation (Year: 2011).*

Midea Group Co., Ltd., Japanese Office Action, JP Patent Application No. 2022-548197, Aug. 29, 2023, 14 pgs.

Tencent Technology, ISRWO, PCT/CN2021/074296, Apr. 9, 2021, 19 pgs.

Midea Group Co., Ltd., Korean Office Action, KR Patent Application No. 10-2022-7032206, Oct. 2, 2024, 8 pgs.

Midea Group Co, Ltd., Chinese Office Action, CN Patent Application No. 2020100969608, Nov. 27, 2024, 17 pgs.

* cited by examiner

MOTOR AND ELECTRIC APPLIANCE

CROSS REFERENCE

The application is a continuation of PCT International Patent Application No. PCT/CN2021/074296, filed on Jan. 29, 2021, entitled "Motor and Electric Appliance", which claims priorities to Chinese Patent Application No. 202020178756.6 and 202010096960.8, filed on Feb. 17, 2020, the contents of which are herein incorporated by reference in their entireties.

TECHNICAL FIELD

The present disclosure relates to the field of motors, and in particular to a motor and an electric appliance.

BACKGROUND

A direct current (DC) brushless motor is driven in a pulse width modulation (PWM) controlling manner. During an operation of the DC brushless motor, a shaft voltage is generated by the motor in cases that a rotor is in an alternating magnetic field, or a magnetic circuit is asymmetry, etc. An inner ring of a rotor bearing and an outer ring of the rotor bearing are connected to each other through a ball. Abrasion and insulation between the ball and bearing components are reduced by an oil film. When the shaft voltage is greater than a certain value, the oil film is broken down by the shaft voltage, such that an electrical corrosion is generated on a surface of the ball or surfaces of the inner ring and the outer ring, resulting in causing noise, thereby shortening a service life of the bearing. In severe cases, the motor fails to operate normally.

SUMMARY

The present disclosure provides a motor and an electric appliance to that may prevent an oil film in a bearing of the motor from being broken down by an excessive shaft voltage, that may consequently resulting in electrical corrosion of the bearing. According to an aspect of the present disclosure, a motor is provided. The motor includes a rotating shaft, a stator, a rotor disposed on the rotating shaft, spaced apart from the stator, and embedded in the stator, a first end cover, and a first bearing. The first bearing includes a first outer ring fixed on the first end cover and insulated from at least part of the first end cover, a first inner ring embedded in the first outer ring, and a first ball disposed between the first outer ring and the first inner ring. The rotating shaft is fixed on the first inner ring and rotationally supported on the first end cover. The part of the first end cover that is insulated from the first outer ring is short-circuited with a stator core of the stator and is grounded.

In some embodiments, the motor further includes a second end cover and a second bearing. The second bearing includes a second outer ring fixed on the second end cover and short-circuited with the second end cover, a second inner ring embedded in the second outer ring, and a second ball disposed between the second outer ring and the second inner ring. The rotating shaft is fixed on the second inner ring and rotationally supported on the second end cover.

In some embodiments, the first outer ring is short-circuited with the second outer ring.

In some embodiments, the first outer ring is short-circuited with the second end cover.

In some embodiments, the motor further includes a second end cover and a second bearing. The second bearing includes a second outer ring fixed on the second end cover and insulated from at least part of the second end cove, a second inner ring embedded in the second outer ring, and a second ball disposed between the second outer ring and the second inner ring. The rotating shaft is fixed on the second inner ring and rotationally supported on the second end cover. The part of the second end cover that is insulated from the second outer ring is short-circuited with the stator core.

In some embodiments, the motor further includes a frame. The first end cover and the second end cover are arranged at intervals along an axial direction of the rotating shaft, two ends of the frame are covered by the first end cover and the second end cover, and the frame, the first end cover, and the second end cover cooperatively define an accommodating cavity. The stator, the rotor, and the rotating shaft are disposed in the accommodating cavity. The rotating shaft further extends to an outer side of the accommodating cavity through the second end cover.

In some embodiments, the motor further includes a first electrical connector embedded in the frame. Two ends of the first electrical connector are drawn out from the frame, and are electrically connected to the first outer ring and the second outer ring respectively. Alternatively, the two ends of the first electrical connector are drawn out from the frame, and are electrically connected to the first outer ring and the second end cover respectively.

In some embodiments, the first end cover defines a first mounting groove, and the first bearing is embedded in the first mounting groove, such that an outer peripheral surface of the first outer ring is disposed opposite to a peripheral sidewall of the first mounting groove, and is insulated from the peripheral sidewall of the first mounting groove. The second end cover defines a second mounting groove, and the second bearing is embedded in the second mounting groove, such that an outer peripheral surface of the second outer ring is disposed opposite to a peripheral sidewall of the second mounting groove.

In some embodiments, the first end cover includes a first cover and a second cover, and the first cover is insulated from the second cover through an insulator. The first outer ring is fixed on and short-circuited with the first cover and the second cover is insulated from the first outer ring, and is short-circuited with the stator core.

In some embodiments, the motor further includes a second electrical connector. two ends of the second electrical connector are electrically connected to the first end cover and the stator core respectively.

According to another aspect of the present disclosure, an electric appliance is provided. The electric appliance includes a fixture and the motor as described above. The fixture is configured to fix the motor, and is insulated from the motor.

In some embodiments of the present disclosure, the first bearing capacitance C1 is defined between the first outer ring and the first inner ring, and the first outer ring is insulated from at least part of the first end cover, such that the equivalent capacitance C2 is defined between the first outer ring and the first end cover. In addition, the part of the first end cover that is insulated from the first outer ring is further short-circuited with the stator core and is grounded, such that the equivalent capacitance C2 and the first bearing capacitance C1 are connected in series, and thus a part of the shaft voltage formed at the first bearing may be divided by the equivalent capacitance C2 after the shaft voltage is generated on the rotating shaft. That is to say, the shaft voltage between the first outer ring and the first inner ring is reduced since the voltage is divided by the equivalent capacitance C2, such that the risk of the electrical corrosion due to an insulation breakdown of the oil film in the first bearing the overlarge shaft voltage may be effectively reduced. That is, the risk of the first bearing capacitance C1 suffering breakdown is reduced, thereby reducing the electrical corrosion generated on the surface between the first ball and the first outer ring, and between the first ball and the first inner ring, thus noise generated by the first bearing due to electrical corrosion is decreased, and the service life of the first bearing is prolonged.

BRIEF DESCRIPTION OF THE DRAWINGS

In order to more clearly describe the technical solutions in the embodiments of the present disclosure or the related art, the drawings that need to be used in the description of the embodiments or the related art will be briefly described in the following. Apparently, the drawings in the following description are only some embodiments of the present disclosure. For those skilled in the art, other drawings can be obtained based on these drawings without creative work.

DETAILED DESCRIPTION

The technical solutions in the embodiments of the present disclosure will be clearly and completely described below in conjunction with the accompanying drawings in the embodiments of the present disclosure. It is clear that the embodiments described are only a part of the embodiments of the present disclosure, and not all of them. Based on the embodiments in the present disclosure, other embodiments obtained by those skilled in the art without creative work fall within the scope of the present disclosure.

The terms "first", "second", and "third" in the present disclosure are intended for descriptive purposes only and are not to be construed as indicating or implying relative importance or implicitly specifying the number of indicated technical features. Thus, a feature qualified with "first", "second", or "third" may either explicitly or implicitly indicate that at least one such feature is included. In the description of the present disclosure, "a plurality" means at least two, e.g., two, three, etc., unless otherwise expressly and specifically limited. In addition, the terms "include" and "have" and any variations thereof are intended to cover non-exclusive inclusion. For example, a process, method, system, product, or apparatus including a series of steps or units is not limited to the listed steps or units, but optionally also includes steps or units not listed, or optionally also includes other steps or units inherent to the process, method, product, or apparatus.

References herein to "embodiments" mean that particular features, structures, or characteristics described in connection with an embodiment may be included in at least one embodiment of the present disclosure. The presence of the phrase at various points in the specification does not necessarily mean a same embodiment, nor a separate or alternative embodiment that is mutually exclusive with other embodiments. It is understood, explicitly or implicitly, by those skilled in the art that the embodiments described herein may be combined with other embodiments.

Figure 1:
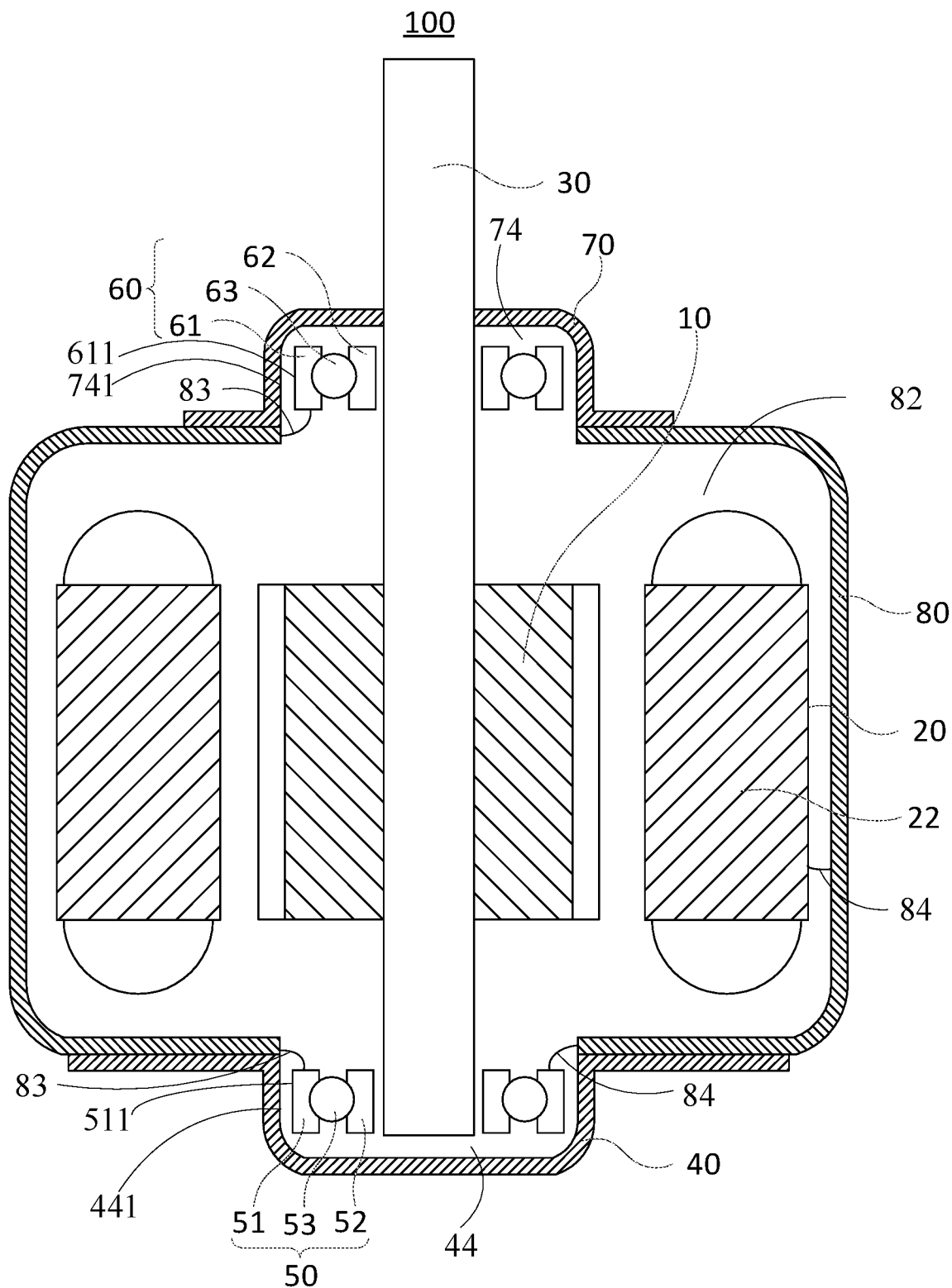
FIG. 1 is a schematic structural view of a motor according to some embodiments of the present disclosure.

A motor 100 is provided by the present disclosure. As shown in FIG. 1, FIG. 1 is a schematic structural view of the motor according to some embodiments of the present disclosure.

The motor 100 includes a rotor 10, a stator 20, and a rotating shaft 30. The rotor 10 is disposed on or sleeved on the rotating shaft 30, and the rotating shaft 30 is embedded in the rotor 10. The stator 20 is spaced apart from the rotor 10 and the rotor 10 is embedded in the stator 20. After the motor 100 is powered, due to an electromagnetic effect generated between the rotor 10 and the stator 20, the rotor 10 rotates relative to the stator 20, thereby driving the rotating shaft 30 to perform power output.

The motor 100 further includes a first end cover 40, a first bearing 50, a second bearing 60, a second end cover 70, and a housing or a frame 80. The first end cover 40 and the second end cover 70 are arranged at intervals along an axial direction of the rotating shaft 30. Two ends of the housing 80 are covered by the first end cover 40 and the second end cover 70, so as to define an accommodating cavity 82. The stator 10, the rotor 20, and the rotating shaft 30 are disposed in the accommodating cavity 82. The rotating shaft 30 further extends to an outer side of the accommodating cavity 82 through the second end cover 70, the rotating shaft 30 is rotationally supported on the first end cover 40 through the first bearing 50, and the rotating shaft 30 is rotationally supported on the second end cover 70 through the second bearing 60.

The first bearing 50 includes a first outer ring 51, a first inner ring 52, and a first ball 53 disposed between the first outer ring 51 and the first inner ring 52. The first inner ring 52 is embedded in the first outer ring 51. The first outer ring 51 is fixed on the first end cover 40, and the rotating shaft 30 is fixed on the first inner ring 52, such that the rotating shaft 30 is rotationally supported on the first end cover 40.

The first outer ring 51 is insulated from at least part of the first end cover 40. Further, the part of the first end cover 40 that is insulated from the first outer ring 51 is short-circuited with a stator core 22 of the stator 20 and is grounded.

The first inner ring 52 is insulated from the first end cover 40. The bearing is usually coated with insulating lubricating grease and other lubricants during the usage of the bearing, such that the first outer ring 51 is insulated from the first inner ring 52, and thus a capacitance between the first outer ring 51 and the first inner ring 52 is substantially equivalent to a first bearing capacitance C1 of the first bearing 50.

The first end cover 40 is short-circuited with the stator core 22 through a second electrical connector 84.

In some embodiments, the second electrical connector 84 may be a wire, a conductive elastic sheet, a conductive elastic probe, or the like. The first end cover 40 is short-circuited with the stator core 22 through the wire, and two ends of the wire are spot welded to the first end cover 40 and the stator core 22 respectively, that is, one end of the wire is spot welded to the first end cover 40, and the other end of the wire is spot welded to the stator core 22. Alternatively, the first end cover 40 is short-circuited with the stator core 22 through the conductive elastic sheet or the conductive elastic probe. The conductive elastic sheet or the conductive elastic probe is connected to a side of the first end cover 40 facing the stator core 22. Further, when the housing 80 is covered by the first end cover 40, the conductive elastic sheet or the conductive elastic probe flexibly abuts against and is electrically contacted with the stator core 22.

In some embodiments, the first end cover 40 may be a metal end cover. The first outer ring 51 may be made of the metal material, and the first outer ring 51 is insulated from the first end cover 40 entirely or completely, such that an equivalent capacitance C2 is formed between the first outer ring 51 and the first end cover 40. In addition, the first end cover 40 is short-circuited with the stator core 22 and is grounded.

Figure 2:
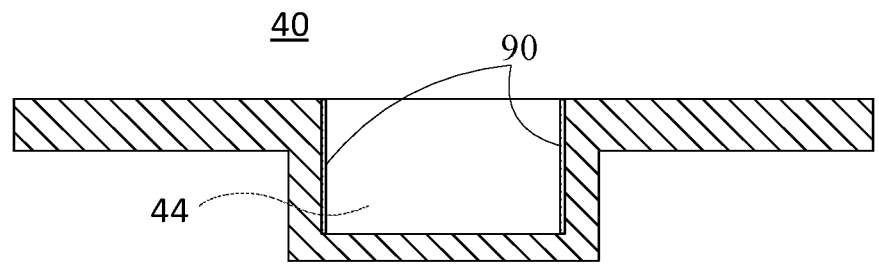
FIG. 2 is a schematic structural view of a first embodiment of a first end cover shown in FIG. 1.
Figure 3:
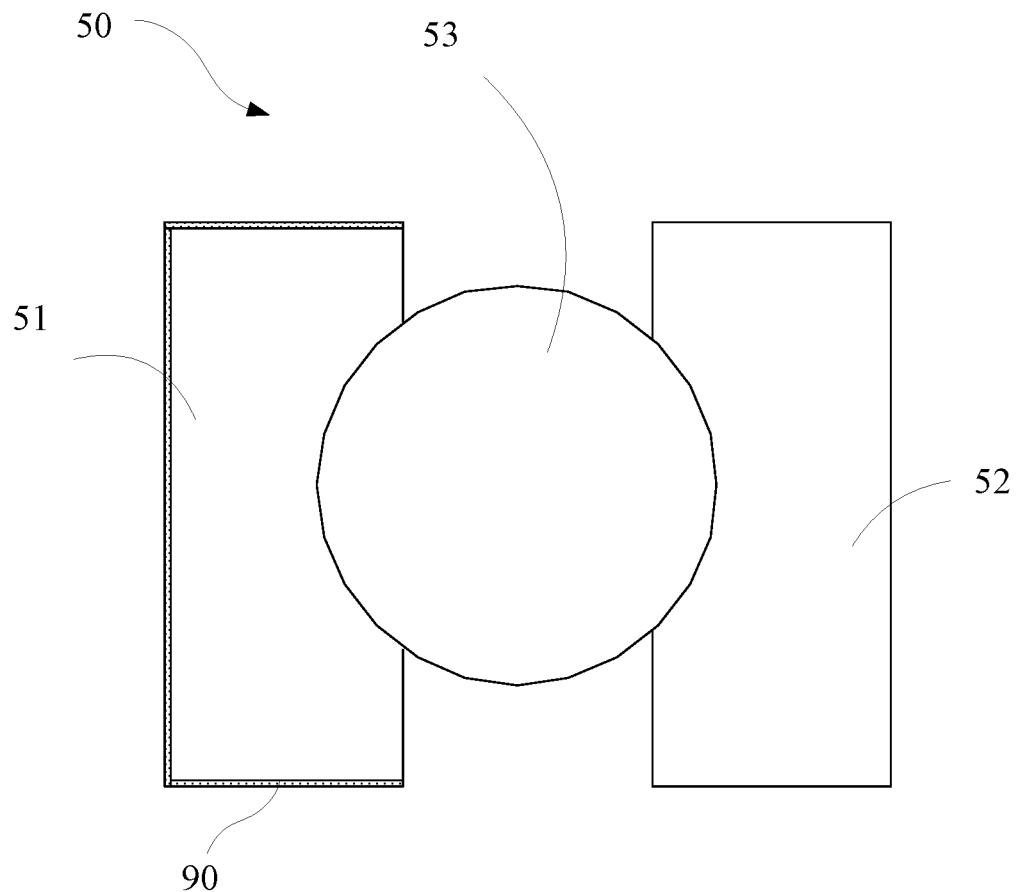
FIG. 3 is a schematic structural view of the first outer ring shown in FIG. 1

As shown in FIG. 1 and FIG. 2, the first end cover 40 defines a first mounting groove 44. The first bearing 50 is embedded in the first mounting groove 44, such that an outer peripheral surface 511 of the first outer ring 51 is disposed opposite to a peripheral sidewall 441 of the first mounting groove 44, and is insulated from the peripheral sidewall 441 of the first mounting groove 44.

Figure 4:
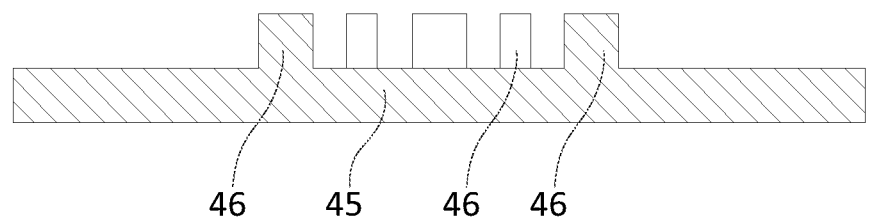
FIG. 4 is a schematic structural view of a second embodiment of the first end cover shown in FIG. 1.

As shown in FIG. 4, the first end cover 40 may further include a cover 45 and a plurality of stoppers 46. The plurality of stoppers 46 are disposed on a side of the cover 45 facing the stator 20. Besides, the plurality of stoppers 46 cooperatively define an accommodating space 47, and the first bearing 50 may be embedded in the accommodating space 47. Further, the outer peripheral surface 511 of the first outer ring 51 is insulated from side surfaces of the stoppers 46 opposite to the outer peripheral surface 511 of the first outer ring 51.

For example, at least one of the first outer ring 51 and a side surface of the first end cover 40 facing the first outer ring 51 are coated with an insulating film 90. That is, the first outer ring 51 is coated with the insulating film 90, or the side surface of the first end cover 40 facing the first outer ring 51 is coated with the insulating film 90, or the first outer ring 51 and the side surface of the first end cover 40 facing the first outer ring 51 are coated with the insulating film 90. Thus the first outer ring 51 is insulated from the first end cover 40, and the equivalent capacitance C2 may be defined.

Alternatively, an insulating element 54 is arranged between the first outer ring 51 and the first end cover 40. The insulating element 54 is disposed between the first outer ring 51 and the first end cover 40. The insulating element 54 may be an insulating collar. The insulating collar is sleeved on the first outer ring 51, and is interlined on the first end cover 40. The insulating element 54 may also be a hollowed-out insulating collar, which is not limited herein.

Due to the alternating magnetic field or the asymmetry magnetic circuit, a shaft voltage may be generated on the rotating shaft 30 by the motor 100. In addition, the rotating shaft 30 is sleeved and fixed on the first inner ring 52, the first outer ring 51 and the first inner ring 52 are connected to each other through the first ball 53, and the abrasion and insulation between the first ball 53 and the first outer ring 51 or between the first ball 53 and the first inner ring 52 are reduced through the oil film. That is, the first outer ring 51 is insulated from the first inner ring 52, the first outer ring 51 is insulated from the first end cover 40, the first end cover 40 is short-circuited with the stator core 22, and the stator core 22 is grounded.

Therefore, the rotating shaft 30 may be equivalent to an output end of the shaft voltage. Further, the output end of the shaft voltage is grounded via the first bearing capacitance C1, the equivalent capacitance C2, and the stator core 22. The stator core 22 is grounded as a zero potential point. In other word, in an equivalence circuit of the motor, the equivalent capacitance C2 and the first bearing capacitance C1 are connected in series, such that a part of the shaft voltage formed at the first bearing 50 may be divided by the equivalent capacitance C2, thereby reducing a shaft voltage across two ends of the first bearing capacitance C1. That is to say, the shaft voltage between the first outer ring 51 and the first inner ring 52 is reduced since the voltage is divided by the equivalent capacitance C2, such that the risk of the electrical corrosion due to an insulation breakdown of the oil film in the first bearing 50 caused by the overlarge shaft voltage may be effectively reduced. That is, the risk of the first bearing capacitance C1 suffering breakdown is reduced, thereby reducing the electrical corrosion generated on the surface between the first ball 53 and the first outer ring 51, and between the first ball 53 and the first inner ring 52, thus noise generated by the first bearing 50 due to the electrical corrosion is decreased, and the service life of the first bearing 50 is prolonged.

In other embodiments, the first end cover 40 may be a composite end cover. The first outer ring 51 is contacted with one part of the first end cover 40, and is insulated from the rest part of the first end cover 40. Further, the rest part of the first end cover 40 that is insulated from the first outer ring 51 is short-circuited with the stator core 22 and is grounded.

Figure 5:
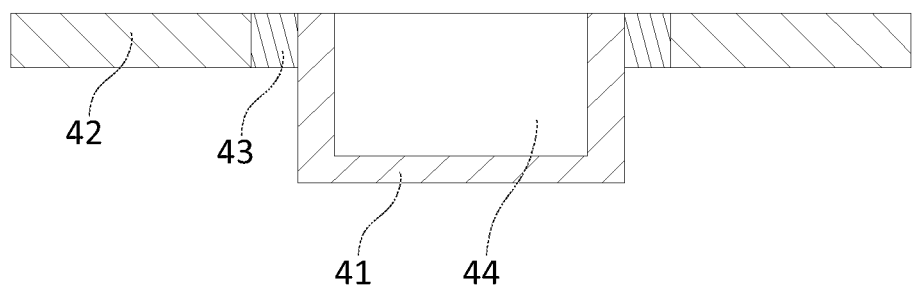
FIG. 5 is a schematic structural view of a third embodiment of the first end cover shown in FIG. 1.

As shown in FIG. 5, the first end cover 40 includes a first cover 41 and a second cover 42, and the first cover 41 is insulated from the second cover 42 through a first insulator 43. The first cover 41 and the second cover 42 may be metal covers. The first outer ring 51 is fixed on and short-circuited with the first cover 41. The second cover 42 is insulated from the first outer ring 51, and is short-circuited with the stator core 22. In other words, the first outer ring 51 is contacted with and short-circuited with the first end cover 40. Further, the first cover 41 is insulated from the second cover 42 through the first insulator 43, such that the second cover 42 is insulated from the first outer ring 51, thereby forming the equivalent capacitance C2 between the first cover 41 and the second cover 42, and thus the shaft voltage across two ends of the first bearing capacitance C1 is also effectively reduced since the voltage is divided by the equivalent capacitance C2. Therefore, the risk of the electrical corrosion caused by the breakdown of the first bearing capacitance C1 formed between the first outer ring 51 and the first inner ring 52 due to the overlarge shaft voltage may be effectively reduced.

As shown in FIG. 5, the first end cover 40 includes the first cover 41, the second cover 42, and the first insulator 43. The first cover 41, the second cover 42, and the first insulator 43 are in an integral structure. The first cover 41 may be in cylindrical shape and define the first mounting groove 44. The bearing 50 is embedded in the first mounting groove 44. The outer peripheral surface 511 of the first outer ring 51 is contacted with and short-circuited with the peripheral sidewall 441 of the first mounting groove 44. Each of the first insulator 43 and the second cover 42 may be in shape of a hollow annular plate. The first insulator 43 is disposed on a peripheral wall of the first cover 41, and the second cover 42 is disposed on a peripheral wall of the first insulator 43.

Taking the first end cover 40 as all-metal end cover as an example, the relationship between the second end cover 70 and the second bearing 60 will be described as follow.

In some embodiments, as shown in FIG. 1, the second bearing 60 includes a second outer ring 61, a second inner ring 62, and a second ball 63 disposed between the second outer ring 61 and the second inner ring 62. The second inner ring 62 is embedded in the second outer ring 61. The second outer ring 61 is fixed on the second end cover 70, and the rotating shaft 30 is fixed on the second inner ring 62, such that the rotating shaft 30 is rotationally supported on the second end cover 70. The second outer ring 61 is short-circuited with the second end cover 70, and the first outer ring 51 is short-circuited with the second outer ring 61 or the second end cover 70.

Figure 6:
FIG. 6 is a schematic structural view of a first embodiment of a second end cover shown in FIG. 1.

As shown in FIG. 1 and FIG. 6, the second end cover 70 defines a second mounting groove 74. The second bearing 60 is embedded in the second mounting groove 74, such that an outer peripheral surface 611 of the second outer ring 61 is disposed opposite to a peripheral sidewall 741 of the second mounting groove 74, and is conductively contacted with the peripheral sidewall 741 of the second mounting groove 74, that is, the second outer ring 61 is short-circuited with the second end cover 70.

Specifically, a first electrical connector 83 is embedded in the housing 80. Two ends of the first electrical connector 83 are drawn out from the housing 80, and are electrically connected to the first outer ring 51 and the second outer ring 61 respectively, that is, one end of the first electrical connector 83 is electrically connected to the first outer ring 51, and the other end of the first electrical connector 83 is electrically connected to the second outer ring 61. Alternatively, two ends of the first electrical connector 83 are drawn out from the housing 80, and are electrically connected to the first outer ring 51 and the second end cover 70 respectively, that is, the one end of the first electrical connector 83 is electrically connected to the first outer ring 51, and the other end of the first electrical connector 83 is electrically connected to the second end cover 70. The first electrical connector 83 may be a first wire, a first conductive elastic sheet, or the like.

For example, the housing 80 may be an insulating housing, such as a plastic housing, a ceramic housing, or the like. The first wire is embedded in the housing 80. The first wire is drawn out from the housing 80, and two ends of the first wire are spot welded to the first outer ring 51 and the second outer ring 61 respectively, that is, one end of the first wire is spot welded to the first outer ring 51 and the other end of the first wire is spot welded to the second outer ring 61, thus it is possible to realize that the first outer ring 51 is short-circuited with the second outer ring 61.

Alternatively, the first conductive elastic sheet is embedded in the housing 80. Two ends of the first conductive elastic sheet protrude or extend out from the housing 80, and elastically abut against and are short-circuited with the first outer ring 51 and the second outer ring 61 respectively, that is, one end of the first conductive elastic sheet elastically abuts against and is short-circuited with the first outer ring 51, and the other end of the first conductive elastic sheet elastically abuts against and is short-circuited with the second outer ring 61. Specifically, a side of the first outer ring 51 facing the stator 20 and a side of the second outer ring 61 facing the stator 20 are elastically contacted with the first conductive elastic sheet respectively, such that the first conductive elastic sheet may be synchronously connected to the first outer ring 51 when the first bearing 50 is assembled on the rotating shaft 30, and the first conductive elastic sheet may be synchronously connected to the second outer ring 61 when the second bearing 60 is assembled on the rotating shaft 30.

Alternatively, the first electrical connector 83 is embedded in the housing 80. One end of the first electrical connector 83 is electrically connected to the first outer ring 51, and the other end of the first electrical connector 83 is exposed from the housing 80 at a position of the housing 80 where the housing 80 is connected to the second end cover 70, such that the second end cover 70 is electrically connected to the first electrical connector 83 when the second end cover 70 is assembled on the housing 80, thus the first outer ring 51 is short-circuited with the second end cover 70. In this way, it is possible to simplify a connection structure between the second end cover 70 and the first electrical connector 83, and it is easy to disassembly the second end cover 70.

The second inner ring 62 is insulated from the second end cover 70. The bearing is usually coated with insulating lubricating grease and other lubricants during the usage of the bearing. When the second outer ring 61 and the second inner ring 62 are connected to each other through the second ball 63, the abrasion and insulation between the second ball 63 and the second outer ring 61 or the second inner ring 62 are reduced through the oil film. That is, the second outer ring 61 is insulated from the second inner ring 62, thus a capacitance between the second outer ring 61 and the second inner ring 62 is substantially equivalent to a second bearing capacitance C3 of the second bearing 60.

The second outer ring 61 is short-circuited with the second end cover 70, and an electromotance of the second end cover 70 is substantially equal to that of the second outer ring 61, that is, an equivalent capacitance is not formed between the second outer ring 61 and the second end cover 70. The first outer ring 51 is short-circuited with the second outer ring 61, and the first inner ring 52 and the second inner ring 62 are contacted with and fixed on the rotating shaft 30. That is, it would be considered that the first inner ring 52 and the second inner ring 62 are short-circuited with the rotating shaft 30, thus the first outer ring 51 and the second inner ring 62 are equipotential, and the first inner ring 52 and the second inner ring 62 are equipotential, which is equivalent to the case that the first bearing capacitance C1 and the second bearing capacitance C3 are connected in parallel.

Furthermore, the equivalent capacitance C2 may divide a shaft voltage formed at two ends of the first bearing capacitance C1 and the second bearing capacitance C3 which are connected in parallel, such that it is possible to reduce a shaft voltage across two ends of each of the first bearing capacitance C1 and the second bearing capacitance C3. That is to say, the shaft voltage across two ends of each of the first bearing capacitance C1 and the second bearing capacitance C3 connected in parallel is reduced since the voltage is divided by the equivalent capacitance C2, such that the risk of electrical corrosion due to an insulation breakdown of the oil film in the first bearing 50 and the second bearing 60 caused by the overlarge shaft voltage may be effectively reduced.

In other embodiments, as shown in FIG. 1, the second bearing 60 includes the second outer ring 61, the second inner ring 62, and the second ball 63 disposed between the second outer ring 61 and the second inner ring 62. The second inner ring 62 is embedded in the second outer ring 61. The second outer ring 61 is fixed on the second end cover 70, and the rotating shaft 30 is fixed on the second inner ring 62, such that the rotating shaft 30 is rotationally supported on the second end cover 70. The second outer ring 61 is short-circuited with at least part of the second end cover 70.

Further, the part of the second end cover 70 that is insulated from the second outer ring 61 is short-circuited with the stator core 22.

As shown in FIG. 6, the second end cover 70 defines the second mounting groove 74. The second bearing 60 is embedded in the second installing groove 74, such that the outer peripheral surface 611 of the second outer ring 61 is disposed opposite to the peripheral sidewall 741 of the second mounting groove 74, and is insulated from the peripheral sidewall 741 of the second mounting groove 74. In addition, the second end cover 70 is short-circuited with the stator core 22 and is grounded, thus an equivalent capacitance C4 is formed between the second outer ring 61 and the second end cover 70.

Figure 7:
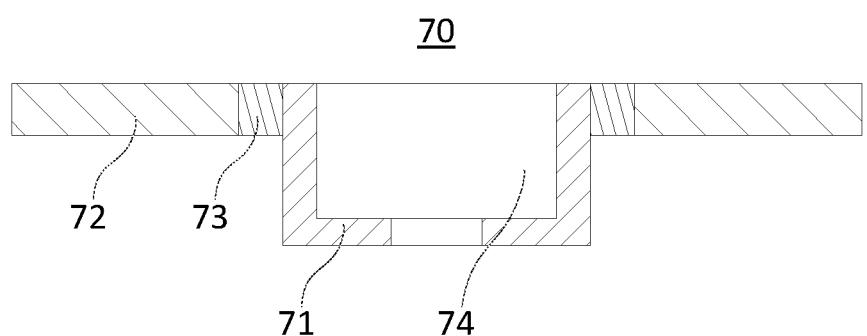
FIG. 7 is a perspective schematic view of a second embodiment of the second end cover shown in FIG. 1.

As shown in FIG. 7, the second end cover 70 includes a third cover 71 and a fourth cover 72, and the third cover 71 is insulated from the fourth cover 72 through a second insulator 73. The third cover 71 and the fourth cover 72 may be the metal covers. The second outer ring 61 is fixed on and short-circuited with the third cover 71. The fourth cover 72 is insulated from the second outer ring 61, and the fourth cover 72 is short-circuited with the stator core 22. In other words, the second outer ring 61 is contacted with and short-circuited with the second end cover 70. Further, the third cover 71 is insulated from the fourth cover 72 through the second insulator 73, such that the fourth cover 72 is insulated from the second outer ring 61, thereby forming the equivalent capacitance C4 between the third cover 71 and the fourth cover 72.

As shown in FIG. 7, the second end cover 70 includes the third cover 71, the fourth cover 72, and the second insulator 73. The third cover 71, the fourth cover 72, and the second insulator 73 are in an integral structure. The third cover 71 may be substantially in a cylindrical shape, and define the second mounting groove 74. The outer peripheral surface 611 of the second outer ring 61 is contacted with and short-circuited with the peripheral sidewall 741 of the second mounting groove 74. Each of the second insulator 73 and the fourth cover 72 may be substantially in shape of a hollow annular plate. The second insulator 73 is disposed on a peripheral wall of the third cover 71, and the fourth cover 72 is disposed on a peripheral wall of the second insulator 73.

The capacitance between the second outer ring 61 and the second inner ring 62 is substantially equivalent to the second bearing capacitance C3 of the second bearing 60. The equivalent capacitance C4 is formed between the second outer ring 61 and the part of the second end cover 70 that is insulated from second outer ring 61, and the part of the second end cover 70 that is insulated from the second outer ring 61 is short-circuited with the stator core 22 and is grounded.

Therefore, a part of a shaft voltage formed at the second bearing 60 may be divided by the equivalent capacitance C4, thereby reducing a shaft voltage across two ends of the second bearing capacitance C3. That is to say, the shaft voltage between the second outer ring 61 and the second inner ring 62 is reduced since the voltage is divided by the equivalent capacitance C4, such that the risk of electrical corrosion due to an insulation breakdown of the oil film in the second bearing 60 caused by the overlarge shaft voltage may be effectively reduced.

Furthermore, the first outer ring 51 is short-circuited with the second outer ring 61, such that an electromotance of the first outer ring 51 is substantially equal to that of the second outer ring 61, and an electromotance of the first inner ring 52 is substantially equal to that of the second inner ring 62, which is equivalent to the case that the equivalent capacitance C2 and the equivalent capacitance C4 are connected in parallel. The first outer ring 51 is short-circuited with the second outer ring 61, and the first end cover 40 and the second end cover 70 are short-circuited with the stator core 22 and are grounded, such that the equivalent capacitance C2 and the equivalent capacitance C4 are connected in parallel.

The second bearing capacitance C3 and the first bearing capacitance C1 are connected in parallel as an entire capacitance A. The equivalent capacitance C2 and the equivalent capacitance C4 are connected in parallel as an entire capacitance B. The entire capacitance A and the entire capacitance B are connected in series, thereby reducing a shaft voltage of the entire capacitance A since the voltage is divided by the entire capacitance B, such that the risk of the electrical corrosion due to an insulation breakdown of the oil film in the first bearing 50 and the second bearing 60 caused by the overlarge shaft voltage may be effectively reduced.

Figure 8:
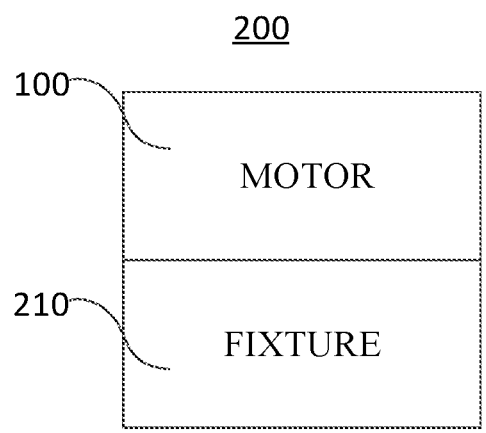
FIG. 8 is a structural schematic view of a home appliance according to some embodiments of the present disclosure.

A home appliance 200 may also be provided in some embodiments of the present disclosure. As shown in FIG. 8, FIG. 8 is a structural schematic view of the home appliance according to some embodiments of the present disclosure.

The electric appliance 200 may be an air conditioner, a washing machine, or the like.

The electric appliance 200 includes a fixture 210 and the above-mentioned motor 100. The fixture 210 is configured to fix the motor 100, and the fixture 210 is insulated from the motor 100.

Specifically, the fixture 210 is insulated from the first end cover 40 and the second end cover 70, such that it is possible to prevent an equivalent area of a distributed capacitance of the first end cover 40 and the second end cover 70 from increasing when the fixture 210 is made of conductive material, thereby preventing the equivalent capacitance C2 between the first end cover 40 and the first bearing 50 from increasing, and preventing the equivalent capacitance C4 between the second end cover 70 and the second bearing 60 from increasing. Further, it is possible to prevent the shaft voltage of the first bearing capacitance C1 of the first bearing 50 from increasing, and prevent the shaft voltage of the second bearing capacitance C3 of the second bearing 60 from increasing, thereby preventing electrical corrosion of the first bearing 50 and the second bearing 60 from occurring due to the increasing of the shaft voltages of the first bearing 50 and the second bearing 60 caused by the improper installation of the motor 100.

Different from the related art, the motor and the electric appliance are provided by the present disclosure. The first bearing capacitance C1 is defined between the first outer ring and the first inner ring, and the first outer ring is insulated from at least part of the first end cover, such that the equivalent capacitance C2 is defined between the first outer ring and the first end cover. In addition, the part of the first end cover that is insulated from the first outer ring is further short-circuited with the stator core and is grounded, such that the equivalent capacitance C2 and the first bearing capacitance C1 are connected in series, thus a part of the shaft voltage formed at the first bearing may be divided by the equivalent capacitance C2 after the shaft voltage is generated on the rotating shaft. That is to say, the shaft voltage between the first outer ring and the first inner ring is reduced due to the voltage is divided by the equivalent capacitance C2, such that the risk of electrical corrosion due to an insulation breakdown of the oil film in the first bearing the overlarge shaft voltage may be effectively reduced. That is, the risk of the first bearing capacitance C1 suffering breakdown is reduced, thereby reducing electrical corrosion generated on the surface between the first ball and the first outer ring, and between the first ball and the first inner ring, thus noise generated by the first bearing due to electrical corrosion is decreased, and the service life of the first bearing is prolonged.

According to an aspect of the present disclosure, a motor is provided. The motor includes a rotating shaft, a stator, a rotor disposed on the rotating shaft, spaced apart from the stator, and embedded in the stator, a first end cover, and a first bearing. The first bearing includes a first outer ring fixed on the first end cover and insulated from at least part of the first end cover, a first inner ring embedded in the first outer ring, and a first ball disposed between the first outer ring and the first inner ring. The rotating shaft is fixed on the first inner ring and rotationally supported on the first end cover. The at least part of the first end cover that is insulated from the first outer ring is short-circuited with a stator core of the stator and is grounded.

In some embodiments, the motor further includes a second end cover and a second bearing. The second bearing includes a second outer ring fixed on the second end cover and short-circuited with the second end cover, a second inner ring embedded in the second outer ring, and a second ball disposed between the second outer ring and the second inner ring. The rotating shaft is fixed on the second inner ring and rotationally supported on the second end cover.

In some embodiments, the first outer ring is short-circuited with the second outer ring.

In some embodiments, the first outer ring is short-circuited with the second end cover.

In some embodiments, the motor further includes a second end cover and a second bearing. The second bearing includes a second outer ring fixed on the second end cover and insulated from at least part of the second end cove, a second inner ring embedded in the second outer ring, and a second ball disposed between the second outer ring and the second inner ring. The rotating shaft is fixed on the second inner ring and rotationally supported on the second end cover. The part of the second end cover that is insulated from the second outer ring is short-circuited with the stator core.

In some embodiments, the motor further includes a frame. The first end cover and the second end cover are arranged at intervals along an axial direction of the rotating shaft, two ends of the frame are covered by the first end cover and the second end cover, and the frame, the first end cover, and the second end cover cooperatively define an accommodating cavity. The stator, the rotor, and the rotating shaft are disposed in the accommodating cavity. The rotating shaft further extends to an outer side of the accommodating cavity through the second end cover.

In some embodiments, the motor further includes a first electrical connector embedded in the frame. Two ends of the first electrical connector are drawn out from the frame, one end of the first electrical connector is electrically connected to the first outer ring, and the other end of the first electrical connector is electrically connected to the second outer ring. Alternatively, the one end of the first electrical connector is electrically connected to the first outer ring, and the other end of the first electrical connector is electrically connected to the second end cover.

In some embodiments, the first end cover defines a first mounting groove, and the first bearing is embedded in the first mounting groove, such that an outer peripheral surface of the first outer ring is disposed opposite to a peripheral sidewall of the first mounting groove, and is insulated from the peripheral sidewall of the first mounting groove. The second end cover defines a second mounting groove, and the second bearing is embedded in the second mounting groove, such that an outer peripheral surface of the second outer ring is disposed opposite to a peripheral sidewall of the second mounting groove.

In some embodiments, the first outer ring is insulated from the first end cover entirely, and at least one of the first outer ring and a side surface of the first end cover facing the first outer ring is coated with the insulating film. Alternatively, an insulating element is arranged between the first outer ring and the first cover, and the first outer ring is insulated from the first cover through the insulating element.

In some embodiments, the first end cover includes a first cover and a second cover, and the first cover is insulated from the second cover through a first insulator. The first outer ring is fixed on and short-circuited with the first cover and the second cover is insulated from the first outer ring, and is short-circuited with the stator core.

In some embodiments, the motor further includes a second electrical connector. One end of the second electrical connector is electrically connected to the first end cover, and the other end of the second electrical connector is electrically connected to the stator core.

In some embodiments, the second electrical connector is a wire, a conductive elastic sheet, or a conductive elastic probe.

According to another aspect of the present disclosure, an electric appliance is provided. The electric appliance includes a fixture and the motor as described above. The fixture is configured to fix the motor, and is insulated from the motor. The above are only embodiments of the present disclosure and are not intended to limit the scope of the present disclosure. Any equivalent structural changes or equivalent process changes made under the concept of the present disclosure, using the contents of the specification of the present disclosure and the accompanying drawings, or applied directly/indirectly in other related fields of technology are included in the scope of protection of the present disclosure.

What is claimed is:
1. A motor, comprising:
   a rotating shaft;
   a stator;
   a rotor, disposed on the rotating shaft, spaced apart from the stator, and embedded in the stator;
   a first end cover;
   a first bearing, comprising:
      a first outer ring, fixed on the first end cover and insulated from at least part of the first end cover;
      a first inner ring, embedded in the first outer ring; and
      a first ball, disposed between the first outer ring and the first inner ring;
   a second end cover; and
   a second bearing, comprising:
      a second outer ring, fixed on the second end cover and short-circuited with the second end cover;
      a second inner ring, embedded in the second outer ring; and
      a second ball, disposed between the second outer ring and the second inner ring;
   wherein;
   the rotating shaft is fixed on the first inner ring and rotationally supported on the first end cover;
   the rotating shaft is fixed on the second inner ring and rotationally supported on the second end cover;

the first outer ring is short-circuited with the second outer ring or the first outer ring is short-circuited with the second end cover; and the at least part of the first end cover that is insulated from the first outer ring is short-circuited with a stator core of the stator and is grounded.

2. The motor as claimed in claim 1, wherein the rotating shaft is fixed on the second inner ring and rotationally supported on the second end cover; and the part of the second end cover that is insulated from the second outer ring is short-circuited with the stator core.

3. The motor as claimed in claim 1, further comprising a frame;

wherein the first end cover and the second end cover are arranged at intervals along an axial direction of the rotating shaft, two ends of the frame are covered by the first end cover and the second end cover, and the frame, the first end cover, and the second end cover cooperatively define an accommodating cavity;

the stator, the rotor, and the rotating shaft are disposed in the accommodating cavity; and the rotating shaft further extends to an outer side of the accommodating cavity through the second end cover.

4. The motor as claimed in claim 3, further comprising:

a first electrical connector embedded in the frame;

wherein two ends of the first electrical connector are drawn out from the frame, one end of the first electrical connector is electrically connected to the first outer ring, and the other end of the first electrical connector is electrically connected to the second outer ring; or the one end of the first electrical connector is electrically connected to the first outer ring, and the other end of the first electrical connector is electrically connected to the second end cover.

5. The motor as claimed in claim 1, wherein the first end cover defines a first mounting groove, and the first bearing is embedded in the first mounting groove, such that an outer peripheral surface of the first outer ring is disposed opposite to a peripheral sidewall of the first mounting groove, and is insulated from the peripheral sidewall of the first mounting groove; and the second end cover defines a second mounting groove, and the second bearing is embedded in the second mounting groove, such that an outer peripheral surface of the second outer ring is disposed opposite to a peripheral sidewall of the second mounting groove.

6. The motor as claimed in claim 1, wherein the first outer ring is insulated from the first end cover entirely, and at least one of the first outer ring and a side surface of the first end cover facing the first outer ring is coated with an insulating film; or an insulating element is arranged between the first outer ring and the first end cover, and the first outer ring is insulated from the first end cover through the insulating element.

7. The motor as claimed in claim 1, wherein the first end cover comprises a first cover and a second cover, and the first cover is insulated from the second cover through a first insulator; and the first outer ring is fixed on and short-circuited with the first cover, and the second cover is insulated from the first outer ring and is short-circuited with the stator core.

8. The motor as claimed in claim 1, further comprising an electrical connector;

wherein one end of the electrical connector is electrically connected to the first end cover, and the other end of the electrical connector is electrically connected to the stator core.

9. The motor as claimed in claim 8, wherein the electrical connector is a wire, a conductive elastic sheet, or a conductive elastic probe.

10. An electric appliance, comprising:

a motor, comprising:
    a rotating shaft;
    a stator;
    a rotor, disposed on the rotating shaft, spaced apart from the stator, and embedded in the stator;
    a first end cover;
    a first bearing, comprising:
        a first outer ring, fixed on the first end cover and insulated from at least part of the first end cover;
        a first inner ring, embedded in the first outer ring; and
        a first ball, disposed between the first outer ring and the first inner ring;
    a second end cover; and
    a second bearing, comprising:
        a second outer ring, fixed on the second end cover and short-circuited with the second end cover;
        a second inner ring, embedded in the second outer ring; and
        a second ball, disposed between the second outer ring and the second inner ring;
    wherein the rotating shaft is fixed on the first inner ring and rotationally supported on the first end cover;
    the rotating shaft is fixed on the second inner ring and rotationally supported on the second end cover;
    the first outer ring is short-circuited with the second outer ring or the first outer ring is short-circuited with the second end cover; and
    the part of the first end cover that is insulated from the first outer ring is short-circuited with a stator core of the stator and is grounded; and
a fixture;
wherein the fixture is configured to fix the motor and is insulated from the motor.

* * * * *